(12) United States Patent
Nozaki

(10) Patent No.: US 11,177,487 B2
(45) Date of Patent: Nov. 16, 2021

(54) POWER SUPPLY APPARATUS FOR VEHICLE

(71) Applicant: SUBARU CORPORATION, Tokyo (JP)

(72) Inventor: Yuichiro Nozaki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 154 days.

(21) Appl. No.: 16/715,829

(22) Filed: Dec. 16, 2019

(65) Prior Publication Data
US 2020/0295385 A1 Sep. 17, 2020

(30) Foreign Application Priority Data

Mar. 11, 2019 (JP) .............................. JP2019-043575

(51) Int. Cl.
*H01M 8/04014* (2016.01)
*H01M 8/04007* (2016.01)
*B60L 50/72* (2019.01)
*H01M 8/04701* (2016.01)

(52) U.S. Cl.
CPC ......... *H01M 8/04014* (2013.01); *B60L 50/72* (2019.02); *H01M 8/04067* (2013.01); *H01M 8/04701* (2013.01); *B60L 2240/36* (2013.01); *H01M 2250/20* (2013.01)

(58) Field of Classification Search
CPC ......... H01M 8/04014; H01M 8/04067; H01M 8/04701; B60L 50/72

USPC ........................................................ 429/434
See application file for complete search history.

(56) References Cited

U.S. PATENT DOCUMENTS

| 2017/0158081 A1* | 6/2017 | Kim .................... H01M 10/615 |
| 2017/0274728 A1* | 9/2017 | Suzuki ................ F04C 18/126 |
| 2018/0117986 A1* | 5/2018 | Kim .................... B60H 1/00278 |
| 2018/0236894 A1 | 8/2018 | Bandai et al. |

FOREIGN PATENT DOCUMENTS

JP  2018-137900 A  8/2018

* cited by examiner

*Primary Examiner* — James M Erwin
(74) *Attorney, Agent, or Firm* — McGinn IP Law Group, PLLC

(57) ABSTRACT

A power supply apparatus for a vehicle includes a fuel cell, an air conditioner condenser, an electrical system radiator, a fuel cell radiator, and a compressor. The air conditioner condenser is disposed in a first circuit of a refrigerant used for air conditioning of a passenger compartment of the vehicle. The electrical system radiator is disposed in a second circuit of a refrigerant used for cooling of in-vehicle electric devices other than the fuel cell. The fuel cell radiator is disposed in a third circuit of a refrigerant used for cooling of the fuel cell. The compressor is disposed in an air passage coupled to the fuel cell and introduces air to the fuel cell through the air passage. One or both of the air conditioner condenser and the electrical system radiator are disposed upstream of the compressor in the air passage.

19 Claims, 4 Drawing Sheets

POWER SUPPLY APPARATUS FOR VEHICLE

CROSS-REFERENCE TO RELATED APPLICATIONS

The present application claims priority from Japanese Application No. 2019-043575 filed on Mar. 11, 2019, the entire contents of which are hereby incorporated by reference.

BACKGROUND

The disclosure relates to a power supply apparatus for a vehicle including a fuel cell.

Japanese Unexamined Patent Application Publication No. 2018-137900, for example disclosed a vehicle including a fuel cell that provided with an air conditioner condenser, an electrical system radiator, and a fuel cell radiator installed to cool a refrigerant used for cooling the fuel cell.

SUMMARY

An aspect of the technology provides a power supply apparatus for a vehicle. The apparatus includes a fuel cell, an air conditioner condenser, an electrical system radiator, a fuel cell radiator, and a compressor. The air conditioner condenser is disposed in a first circuit of a refrigerant used for air conditioning of a passenger compartment of the vehicle. The electrical system radiator is disposed in a second circuit of a refrigerant used for cooling of in-vehicle electric devices other than the fuel cell. The fuel cell radiator is disposed in a third circuit of a refrigerant used for cooling of the fuel cell. The compressor is disposed in an air passage coupled to the fuel cell, and is configured to introduce air to the fuel cell through the air passage. One or both of the air conditioner condenser and the electrical system radiator are disposed upstream of the compressor in the air passage.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Some embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

1. First Embodiment

A vehicle 1 according to a first embodiment of the technology will now be described.

1-1 Configuration of Vehicle

Figure 1:
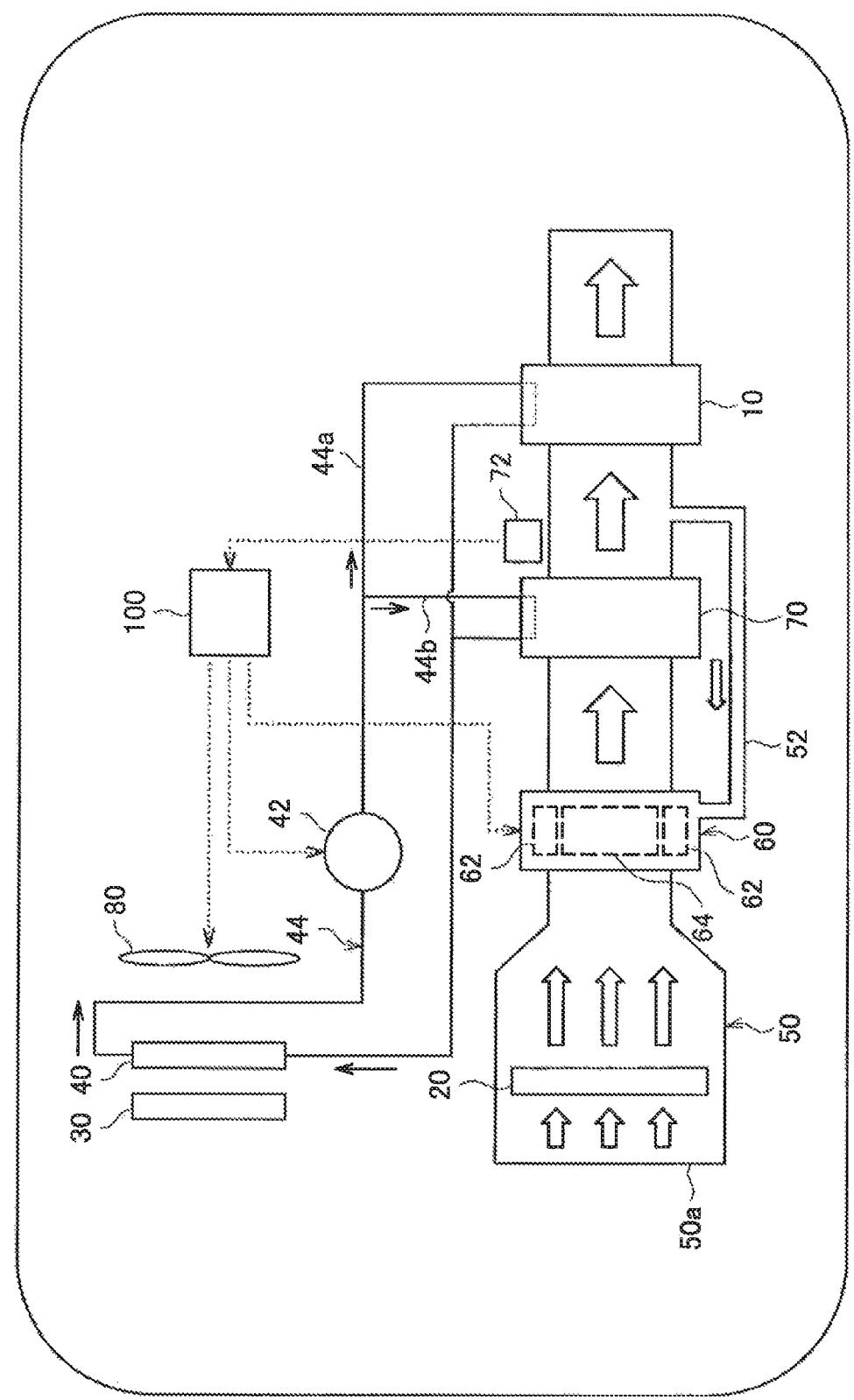
FIG. 1 is a schematic view of the configuration of a power supply apparatus for a vehicle according to an embodiment of the technology.

The outline of the configuration of the vehicle 1 according to the first embodiment will now be described with reference to FIG. 1. FIG. 1 is a schematic view of the configuration of the vehicle 1 according to the first embodiment.

As illustrated in FIG. 1, the vehicle 1 includes a fuel cell 10, an air conditioner condenser 20, an electrical system radiator 30, a fuel cell radiator 40, and a compressor 60. The vehicle 1 may further include a heat exchanger 70. The compressor 60 is disposed in an air passage 50 through which air is supplied to the fuel cell 10. The heat exchanger 70 may be disposed downstream of the compressor 60 in the air passage 50. One or both of the air conditioner condenser 20 and the electrical system radiator 30 are disposed upstream of the compressor 60 in the air passage 50. The vehicle 1 may further include a pump 42, a fan 80, a temperature sensor 72, and a controller 100.

In the first embodiment, the air conditioner condenser 20 is disposed upstream of the compressor 60 in the air passage 50. Thus, as indicated by the white arrows in FIG. 1, the air drawn into the air passage 50 may flow through the air conditioner condenser 20, the compressor 60, and the heat exchanger 70, in this order from the upstream side, to the fuel cell 10.

The fuel cell 10 may generate electrical power through a reaction of fuel gas and oxidization gas, or, in specific, hydrogen gas and air. The fuel cell 10 may include, for example, a fuel electrode, an air electrode, and an electrolyte film disposed between the fuel electrode and the air electrode. By supplying the hydrogen gas to the fuel electrode and the air to the air electrode, reactions may proceed at the electrodes. In this way, the fuel cell 10 may generate electrical power. The electrical power generated by the fuel cell 10 may be supplied to the electric components, such as an electric motor that drives the driven wheels, installed in the vehicle 1.

The fuel cell 10 is coupled to the air passage 50, which is the passage of the air to be supplied to the fuel cell 10. The air passage 50 may have an external air inlet 50*a*. The air supplied to the fuel cell 10 may be taken in through the external air inlet 50*a*. The external air inlet 50*a* may be provided with a non-illustrated filter for removing foreign material.

The air conditioner condenser 20 may cool the refrigerant used by the air conditioner of the vehicle 1. The air conditioner condenser 20 is disposed in a refrigerant circuit through which the refrigerant circulates. Such a refrigerant circuit may be further provided with an air conditioner compressor, an expansion valve, and an evaporator, to perform a known air conditioning process. That is, the refrigerant compressed by the air conditioner compressor may be cooled at the air conditioner condenser 20 through heat exchange with external air. The cooled refrigerant may be expanded by the expansion valve and vaporized at the evaporator to cool the air around the evaporator. The cooled air may be output to the passenger compartment of the vehicle 1 to condition the air in the vehicle 1. The refrigerant of the air conditioner condenser 20 may be effectively cooled by the external air drawn into the air passage 50 by the compressor 60 and passing through the vicinity of the air conditioner condenser 20.

The compressor 60 may draw external air into the air passage 50, compress the inlet air, and output the compressed air to the downstream side of the air passage 50. The compressor 60 may include, for example, an electric motor that drives the compressor 60. For instance, the compressor 60 may include an air bearing 62 and an impeller 64 supported by the air bearing 62. In one embodiment, the impeller 64 may serve as a "rotor." The air passage 50 may include a return passage 52 that returns a portion of the air flowing through the air passage 50 to the air bearing 62. The return passage 52 may couple a section of the air passage 50 downstream of the heat exchanger 70 to the air bearing 62. The portion of the air flowing through the air passage 50 may be supplied to the air bearing 62 through the return passage 52. The air supplied to the air bearing 62 may form an air film or air layer between the air bearing 62 and the impeller 64. This enables the air bearing 62 to support the rotation of the impeller 64 and allows the impeller 64 to rotate at high speed. Note that, if no air is supplied to the air bearing 62, no air film may be formed. Consequently, the air bearing 62 and the impeller 64 may come into contact with each other. An increase in the frequency of contact between the air bearing 62 and the impeller 64 can shorten the service life of the compressor 60. Thus, as described below, the compressor 60 of the vehicle 1 including the air bearing 62 may be driven regardless of whether the fuel cell 10 is generating power, to return the air to the compressor 60.

The heat exchanger 70 may cool the compressed air outputted from the compressor 60. The heat exchanger 70 may exchange heat between the refrigerant flowing through a refrigerant sub-channel 44b (described below) and the air flowing through the air passage 50. Such heat exchange may cool the air having a temperature elevated as a result of being compressed by the compressor 60. The air cooled by the heat exchanger 70 in this way may be sent to the fuel cell 10.

The electrical system radiator 30 is installed in the vehicle 1 to cool the refrigerant used for cooling electric devices radiating heat, such as in-vehicle electric components including the electric motor that drives the driven wheels of the vehicle 1, the battery, and the DC-to-DC converter. The electrical system radiator 30 is disposed in the refrigerant circuit through which the refrigerant circulates. Such a refrigerant circuit may also be provided with the pump 42. The refrigerant that has been cooled through heat exchange with external air at the electrical system radiator 30 may be outputted by the pump 42 and exchange heat with the devices listed above to cool the devices.

The fuel cell radiator 40 may cool the refrigerant used for cooling the fuel cell 10. The fuel cell radiator 40 is coupled to a refrigerant channel 44 through which the refrigerant used for cooling the fuel cell 10 flows. The refrigerant channel 44 may include a refrigerant sub-channel 44a extending through the vicinity of the fuel cell 10 and a refrigerant sub-channel 44b extending through the vicinity of the heat exchanger 70. The refrigerant channel 44 may be provided with the pump 42 that outputs the refrigerant flowing through the refrigerant channel 44. The pump 42 may include, for example, an electric motor that drives the pump 42. The refrigerant that has been cooled through heat exchange with external air at the fuel cell radiator 40 may be outputted by the pump 42. The refrigerant flowing through the refrigerant sub-channel 44a may exchange heat with the fuel cell 10 to cool the fuel cell 10. As described above, the refrigerant flowing through the refrigerant sub-channel 44b may exchange heat with the air flowing through the air passage 50, to cool the air that has an elevated temperature as a result of being compressed by the compressor 60.

The electrical system radiator 30 and the fuel cell radiator 40 may be disposed on the inner side of the front grille along the traveling direction of the vehicle 1. The electrical system radiator 30 and the fuel cell radiator 40 may receive air flowing in from outside the vehicle 1 when the vehicle 1 is traveling. The vehicle 1 may include a fan 80 that supplies air to the electrical system radiator 30 and the fuel cell radiator 40. The fan 80 may include, for example, an electric motor that drives the fan 80. The air supplied by the fan 80 may pass through the vicinity of the electrical system radiator 30 and the vicinity of the fuel cell radiator 40, to effectively cool the refrigerant of the electrical system radiator 30 and the fuel cell radiator 40.

The temperature sensor 72 may detect the temperature of the air flowing into the fuel cell 10 and output the detected result to the controller 100.

The controller 100 may output operation commands to the pump 42, the compressor 60, and the fan 80, to control the operations of the pump 42, the compressor 60, and the fan 80. Such control by the controller 100 will be described in detail below.

The controller 100 may be a microcomputer including a central processing unit (CPU), a read-only memory (ROM) that stores programs, operation parameters, etc., used by the CPU, and a random-access memory (RAM) that temporarily stores parameters, etc., that appropriately vary during operation of the CPU.

The controller 100 may communicate with the components installed in the vehicle 1. The controller 100 may establish communication with the components, for example, via a controller area network (CAN). For example, the controller 100 may communicate with the pump 42, the compressor 60, the fan 80, and the temperature sensor 72. Alternatively, the functions of the controller 100 may be distributed among multiple controllers. In such a case, the multiple controllers may be coupled to each other via a communication bus, such as a CAN. The controller 100 may have additional functions besides those described below.

As described above, in the vehicle 1 according to the first embodiment, the air conditioner condenser 20 may be disposed in the air passage 50. This allows the ventilation resistance around the fuel cell radiator 40 to be smaller than, for example, the ventilation resistance in a case where the air conditioner condenser 20, the electrical system radiator 30, and the fuel cell radiator 40 are collectively disposed behind the front grille. Furthermore, this may reduce the influence of the exhaust heat from the air conditioner condenser 20 on the fuel cell radiator 40. In this way, it is possible to suppress the reduction in the cooling performance of the fuel cell radiator 40.

In the vehicle 1 according to the first embodiment, the air conditioner condenser 20 may be disposed in the air passage 50. This eliminates the situation where the fan 80 needs to be operated to cool the air conditioner condenser 20. Consequently, it is possible to reduce the frequency of overcooling of the fuel cell radiator 40 as a result of the fan 80 being driven when cooling of the fuel cell radiator 40 is not required.

1-2 Operation of Vehicle

Figure 2:
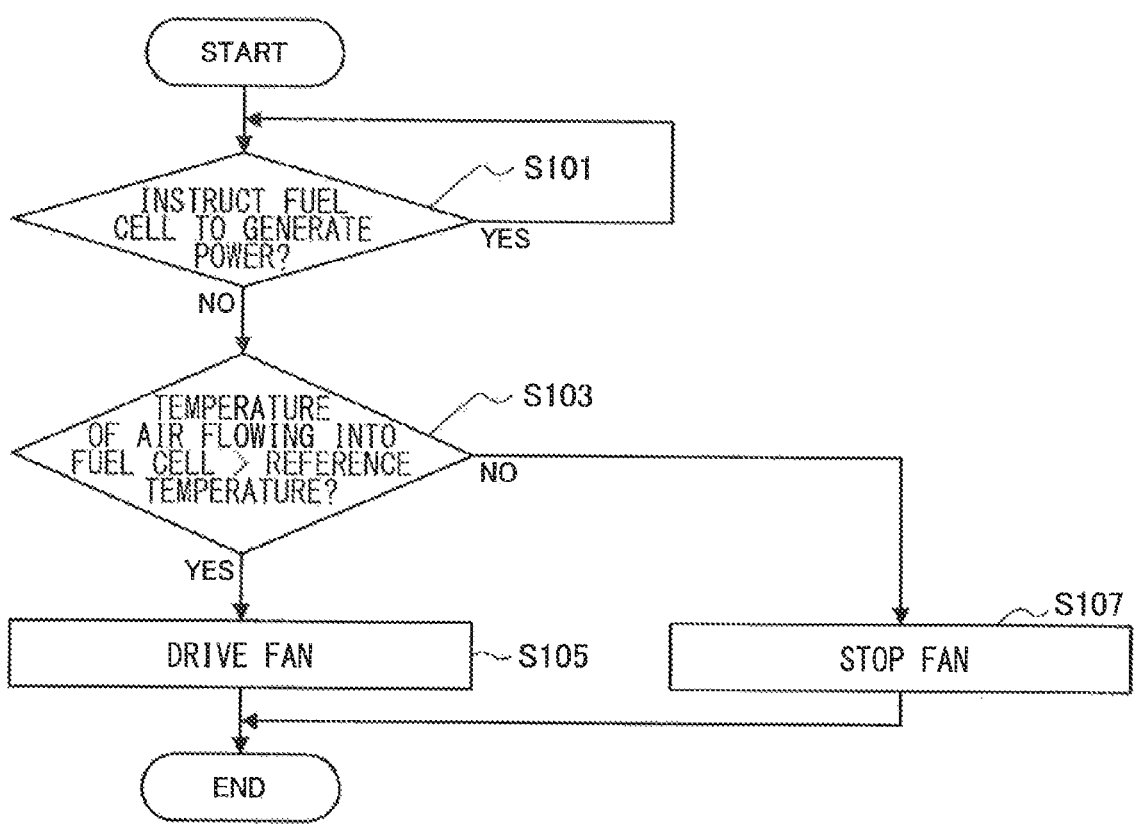
FIG. 2 is a flowchart illustrating a process executed by a controller of the power supply apparatus according to an embodiment.

The operation of the vehicle 1 according to an embodiment will now be described with reference to FIG. 2. FIG. 2 is a flowchart illustrating a control process executed by the controller 100 of the vehicle 1 according to this embodiment. The controller 100 may be programmed to repeatedly execute the control process illustrated in FIG. 2 in a predetermined cycle.

When the control process illustrated in FIG. 2 starts, the controller 100 may determine whether to instruct the fuel cell 10 to generate power in Step S101. If the fuel cell is instructed to generate power (Step S101: YES), Step S101 may be repeated. If the fuel cell 10 is not instructed to generate power (Step S101: NO), the procedure may proceed to Step S103.

For example, the controller 100 may determine whether to instruct the fuel cell 10 to generate power on the basis of a requested value of power to be fed to the electric motor driving the driven wheels of the vehicle 1. The requested value may be calculated, for example, from parameters, such as the accelerator position.

When the controller 100 instructs the fuel cell 10 to generate power, the compressor 60 may be driven to supply oxidization gas or air to the fuel cell 10. The controller 100 may also supply fuel gas or hydrogen gas to the fuel cell 10. In this way, the fuel cell 10 may generate electrical power. When the controller 100 instructs the fuel cell 10 to stop generating power, basically, the hydrogen gas supply to the fuel cell 10 may be stopped. In this way, the fuel cell 10 may stop generating power. Note that, while the fuel cell 10 stops generating power, the controller 100 may supply a small amount of hydrogen gas to the fuel cell 10 to keep the fuel cell 10 in an idling mode. While the fuel cell 10 stops generating power, the controller 100 may drive the pump 42 and the fan 80 depending on the temperature of the fuel cell 10, to cool the fuel cell 10.

The controller 100 may drive the compressor 60 regardless of whether the fuel cell 10 is generating power. In this way, air may be supplied to the air bearing 62 through the return passage 52, and the air film between the air bearing 62 and the impeller 64 may be maintained regardless of whether the fuel cell 10 is generating power. This reduces the possibility of the air film disappearing while the fuel cell 10 stops generating power and the air bearing and the impeller 64 coming into contact with each other, thereby shortening the service life of the air bearing 62.

By driving the compressor 60, external air may be drawn into the air passage 50. Thus, air may pass through the vicinity of the air conditioner condenser 20 regardless of whether the fuel cell 10 is generating power. This effectively cools the refrigerant used in the air conditioner of the vehicle 1.

The controller 100 may drive the pump 42 while the fuel cell 10 stops generating power. By driving the pump 42, the refrigerant cooled by the fuel cell radiator 40 may circulate in the refrigerant channel 44 and heat is exchanged between the refrigerant flowing through the refrigerant sub-channel 44b and the air flowing through the air passage 50. Thus, it is possible to prevent the temperature of the air to be introduced to the fuel cell 10 from excessively increasing when the compressor 60 is driven even while the fuel cell 10 stops generating power.

In Step S103, the controller 100 may determine whether the temperature of the air to be introduced to the fuel cell 10 is higher than a reference temperature. If the temperature of the air to be introduced to the fuel cell 10 is higher than the reference temperature (Step S103: YES), the procedure may proceed to Step S105. If the temperature of the air to be introduced to the fuel cell 10 is lower than or equal to the reference temperature (Step S103: NO), the procedure may proceed to Step S107.

For example, the reference temperature may be set to a temperature that allows determination of whether the temperature of the air to be introduced to the fuel cell 10 is high enough to cause thermal wear of the fuel cell 10.

Note that the temperature of the air to be introduced to the fuel cell 10 in Step S103 may be any temperature that correlates with the temperature of any heat transmitted to the fuel cell 10, besides the temperature of the air to be introduced to the fuel cell 10. An example of such a temperature may be the temperature of the heat exchanger 70.

In Step S105, the controller 100 may drive the fan 80. Driving the fan 80 may promote the cooling of the refrigerant flowing through the fuel cell radiator 40. In this way, it is possible to lower the temperature of the air to be introduced to the fuel cell 10 to the reference temperature or below.

In Step S107, the controller 100 may stop the fan 80. In this way, it is possible to prevent the fan 80 from being unnecessarily driven.

As described above, the controller 100 may instruct the fan 80 to continue to operate while the compressor 60 is being driven, even while the fuel cell 10 stops generating power. In this way, it is possible to more appropriately prevent the temperature of the air to be introduced to the fuel cell 10 from excessively increasing.

After Step S105 or S107, the control process may end.

1-3 Effects of Vehicle

Some effects achieved through this embodiment will now be described.

Fuel cells have appropriate operating temperatures. The efficiency of power generation by fuel cells depends on temperature. For example, polymer electrolyte fuel cells have a typical operating temperature within the range of 70 to 90 degrees Celsius. Thus, in order to increase the efficiency of power generation by a fuel cell, it is desirable to appropriately control the temperature of the fuel cell so as to achieve high efficiency in power generation by the fuel cell. However, in some cases, it is difficult to appropriately control the temperature of the fuel cell in a vehicle provided with an air conditioner condenser, an electrical system radiator, and a fuel cell radiator.

For example, it is difficult to appropriately control the temperature of the fuel cell in a vehicle provided with an air conditioner condenser, an electrical system radiator, and a fuel cell radiator that are disposed overlapping each other behind the front grille along the traveling direction of the vehicle, i.e., the flow direction of cooled air. In such a vehicle, the ventilation resistance around the fuel cell radiator can readily increase. As a result, the actual air volume can be smaller than the air volume required by the fuel cell radiator to cool the refrigerant. The fuel cell radiator can also be affected by the exhaust heat from the air conditioner condenser or the electrical system radiator. In such a case, the effect of the exhaust heat in combination with the insufficient air volume can preclude a sufficient decrease in the temperature of the fuel cell.

The vehicle including the air conditioner condenser, the electrical system radiator, and the fuel cell radiator that are disposed overlapping each other behind the front grille may further include a shared fan that supplies cooling air to the condenser and radiators. In such a case, the fan can be driven in response to a request from another condenser or radiator or the like, even when no cooling air needs to be supplied to the fuel cell radiator. This can excessively lower the temperature of the fuel cell.

Given the above-described circumstances, it is desirable to appropriately control the temperature of the fuel cell while preventing insufficient or excessive cooling of the fuel cell radiator.

The vehicle 1 according to the embodiment includes a fuel cell 10, an air conditioner condenser 20, an electrical system radiator 30, and a fuel cell radiator 40. One or both of the air conditioner condenser 20 and the electrical system radiator 30 (for example, the air conditioner condenser 20) are disposed in the air passage 50 upstream of the compressor 60. In this way, it is possible to reduce the ventilation resistance around the fuel cell radiator 40. Furthermore, it is possible to suppress the influence of the exhaust heat from the air conditioner condenser 20 and the electrical system radiator 30, on the fuel cell radiator 40. It is also possible to prevent the temperature of the fuel cell 10 from excessively decreasing as a result of the fan 80 being driven when no air needs to be supplied to the fuel cell radiator 40. Thus, it is possible to appropriately control the temperature of the fuel cell 10. For example, it is possible to control the temperature of the fuel cell 10 so as to enhance the efficiency of the power generation by the fuel cell 10.

Note that, in the vehicle 1 according to the embodiment, the compressor 60 may be driven to draw external air into the air passage 50. In this way, it is possible to appropriately cool one or both of the air conditioner condenser 20 and the electrical system radiator 30 disposed in the air passage 50 (for example, the air conditioner condenser 20) by the external air drawn into the air passage 50.

In one example, the compressor 60 of the vehicle 1 may include an air bearing 62, and the controller 100 may drive the compressor 60 regardless of whether the fuel cell 10 is generating power. This reduces the possibility of the air bearing and the impeller 64 coming into contact with each other while the fuel cell 10 stops generating power, thereby shortening the service life of the air bearing 62.

It is also possible to effectively use the compressor 60, which is driven regardless of whether the fuel cell 10 is generating power, and appropriately cool one or both of the air conditioner condenser 20 and the electrical system radiator 30 disposed in the air passage 50 (for example, the air conditioner condenser 20).

In one example, the controller 100 of the vehicle 1 may drive the pump 42 while the fuel cell 10 stops generating power and the compressor 60 is driven. In this way, it is possible to prevent the temperature of the air to be introduced to the fuel cell 10 from excessively increasing while the fuel cell 10 stops generating power and the compressor 60 is driven.

In one example, the controller 100 of the vehicle 1 may control the operation of the fan 80 so as to lower the temperature of the air to be introduced into the fuel cell 10 to the reference temperature or below while the fuel cell 10 stops generating power and the compressor 60 is driven. In this way, it is possible to more appropriately prevent the temperature of the air to be introduced to the fuel cell 10 from excessively increasing while the fuel cell 10 stops generating power and the compressor 60 is driven.

In one example, at least the air conditioner condenser 20 out of the air conditioner condenser 20 and the electrical system radiator 30 may be disposed upstream of the compressor 60 in the air passage 50 in the vehicle 1. Typically, the frequency of requesting forcible supply of cooling air to the air conditioner condenser 20 may be higher than the frequency of requesting forcible supply of cooling air to the electrical system radiator 30. Thus, by disposing the air conditioner condenser 20 upstream of the compressor 60 in the air passage 50, it is possible to prevent the temperature of the fuel cell 10 from excessively decreasing as a result of the fan 80 being driven when no cooling air needs to be supplied to the fuel cell radiator 40. Thus, it is possible to more appropriately control the temperature of the fuel cell 10.

2. Second Embodiment

A vehicle 2 according to a second embodiment of the technology will now be described. In the description below, the content overlapping with the content of the first embodiment will be omitted, and the difference from the first embodiment will be described.

2-1 Configuration of Vehicle

Figure 3:
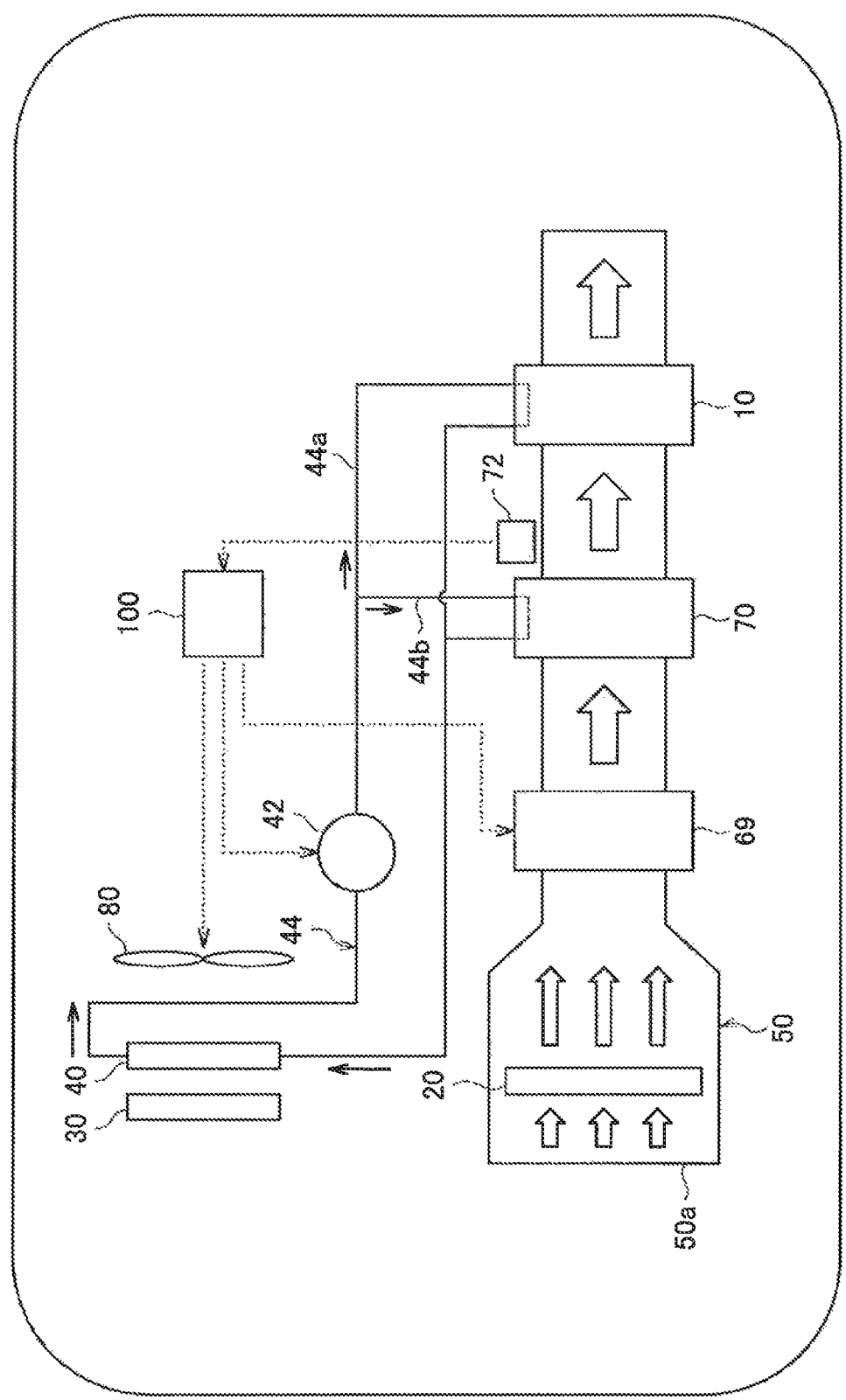
FIG. 3 is a schematic view of the configuration of a power supply apparatus for a vehicle according to an embodiment of the technology.

The outline of the configuration of the vehicle 2 according to the second embodiment will now be described with reference to FIG. 3. FIG. 3 is a schematic view of the configuration of the vehicle 2 according to the second embodiment. The vehicle 2 according to the second embodiment has a configuration different from the above-described vehicle 1 in regard to the compressor 60.

As illustrated in FIG. 3, the vehicle 2 may include a compressor 69 in place of the compressor 60 of the vehicle 1. Unlike the above-described compressor 60, the compressor 69 may include a bearing, such as a rolling-element bearing, that supports the impeller without returning a portion of the air flowing through the air passage 50. Thus, unlike vehicle 1, the vehicle 2 may not be provided with a return passage that returns a portion of the air flowing through the air passage 50 to the air bearing. Note that the configuration of the compressor 69 other than the bearing is the same as that of the above-described compressor 60. Thus, the compressor 69 will not be described in detail below.

2-2 Operation of Vehicle

Figure 4:
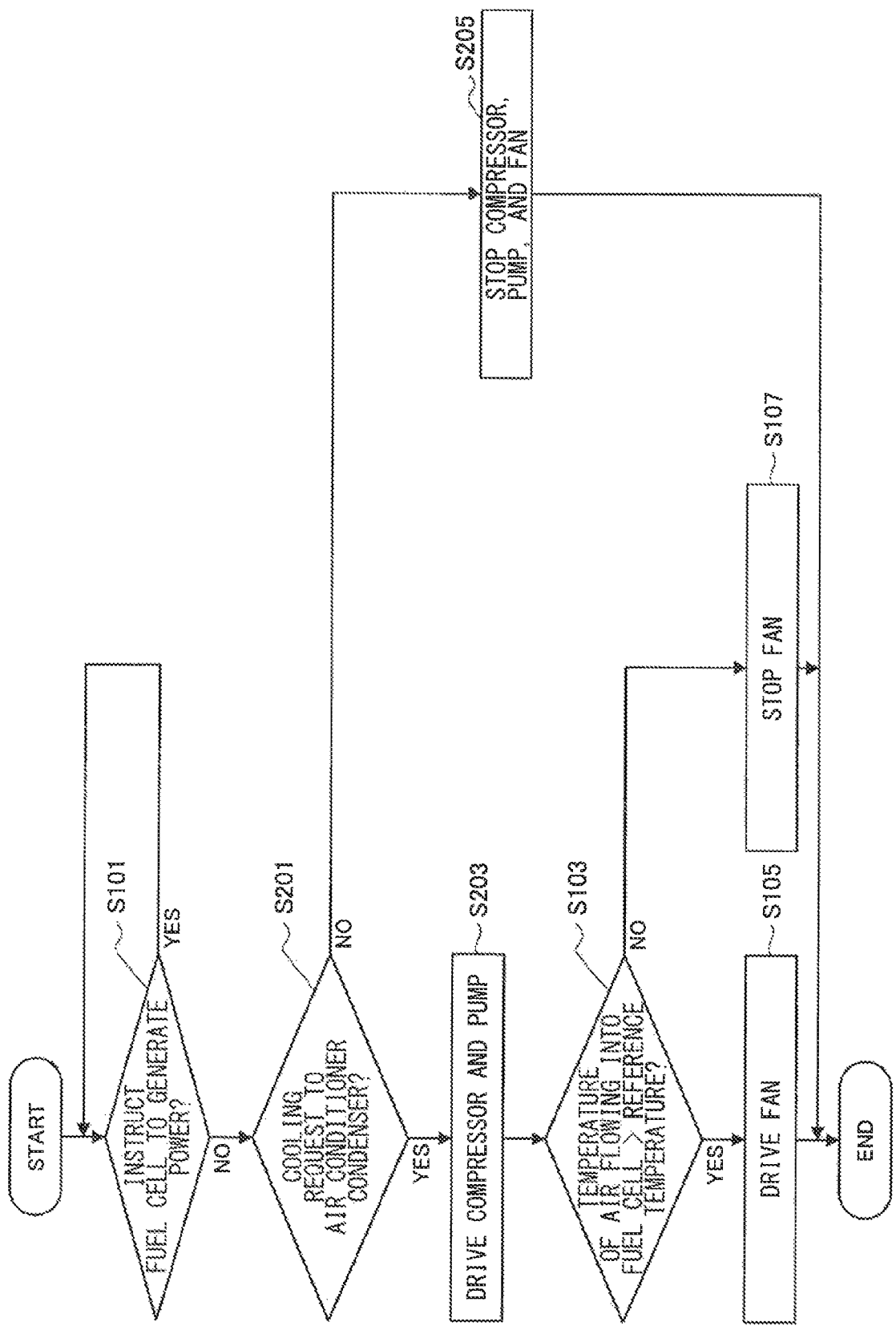
FIG. 4 is a flowchart illustrating a process executed by a controller of the power supply apparatus according to an embodiment.

The operation of the vehicle 2 will now be described with reference to FIG. 4. FIG. 4 is a flowchart illustrating a process executed by the controller 100 of the vehicle 2 according to the second embodiment. The controller 100 may be programmed to repeatedly execute the control process illustrated in FIG. 4 in a predetermined cycle.

When the control process illustrated in FIG. 4 starts, the controller 100 may determine whether to instruct the fuel cell 10 to generate power in Step S101. If the fuel cell 10 is instructed to generate power (Step S101: YES), Step S101 may be repeated. If the fuel cell 10 is instructed to stop generating power (Step S101: NO), the procedure may proceed to Step S201.

As in the first embodiment, when the controller 100 instructs the fuel cell 10 to generate power, the compressor 69 may be driven to supply oxidization gas or air to the fuel cell 10. The controller 100 may also supply fuel gas or hydrogen gas to the fuel cell 10. In this way, the fuel cell 10 may generate electrical power. When the controller 100 instructs the fuel cell 10 to stop generating power, the hydrogen gas supply to the fuel cell 10 may be stopped. In this way, the fuel cell 10 may stop generating power. Note that, while the fuel cell 10 stops generating power, the controller 100 may supply a small amount of hydrogen gas to the fuel cell 10 to keep the fuel cell 10 in an idling mode.

During the power generation by the fuel cell 10, the controller 100 may drive the pump 42 and the fan 80 depending on the temperature of the fuel cell 10, to cool the fuel cell 10.

Unlike the first embodiment, the controller 100 may control the compressor 69 and the pump 42 in accordance with a cooling request to the air conditioner condenser 20 described below, while the fuel cell 10 stops generating power.

In Step S201, the controller 100 may determine whether there is a cooling request to the air conditioner condenser 20. If there is a cooling request to the air conditioner condenser 20 (Step S201: YES), the procedure may proceed to Step S203. If there is no cooling request to the air conditioner condenser 20 (Step S201: NO), the procedure may proceed to Step S205.

For example, the controller 100 may determine whether there is a cooling request to the air conditioner condenser 20 on the basis of data outputted from an air-conditioner electronic control unit (air-conditioner ECU) that controls the operation of the air conditioner. For example, the controller 100 may determine that there is a cooling request to the air conditioner condenser 20 when the controller 100 receives data regarding the driving of the air conditioner compressor disposed in the refrigerant circuit of the air conditioner, from the air-conditioner ECU.

In Step S203, the controller 100 may drive the compressor 69 and the pump 42. By driving the compressor 69, external air may be drawn into the air passage 50. Drawing the external air into the air passage 50 may cause the air to pass through the vicinity of the air conditioner condenser 20 disposed in the air passage 50. Thus, when there is a cooling request to the air conditioner condenser 20, the refrigerant used in the air conditioner of the vehicle 2 may be effectively cooled even while the fuel cell 10 stops generating power.

In one example, the controller 100 may control the operation of the compressor 69 in accordance with the difference between the current temperature of the air conditioner condenser 20 and a target temperature of the air conditioner condenser 20. The target temperature of the air conditioner condenser 20 may be a temperature of the air conditioner condenser 20 at which the air conditioner operates to cause the passenger compartment of the vehicle 2 to reach the temperature requested by the driver or passenger of the vehicle 2. The controller 100 may increase the output of the compressor 69 in proportion to the difference between the current temperature of the air conditioner condenser 20 and the target temperature of the air conditioner condenser 20. In this way, it is possible to adjust the volume of the external air drawn into the air passage 50 in accordance with the difference between the current temperature of the air conditioner condenser 20 and the target temperature of the air conditioner condenser 20.

The control process illustrated in FIG. 4 may proceed from Step S203 to Step S103.

In Step S103, the controller 100 may determine whether the temperature of the air to be introduced to the fuel cell 10 is higher than a reference temperature. If the temperature of the air to be introduced to the fuel cell 10 is higher than the reference temperature (Step S103: YES), the procedure may proceed to Step S105. If the temperature of the air to be introduced to the fuel cell 10 is lower than or equal to the reference temperature (Step S103: NO), the procedure may proceed to Step S107.

In Step S105, the controller 100 may drive the fan 80.
In Step S107, the controller 100 may stop the fan 80.

In Step S205, the controller 100 may stop the driving of the compressor 69, the pump 42, and the fan 80.

After Step S105, S107, or S205, the controller 100 may end the control process.

The process executed by the controller 100 in the example in which the air conditioner condenser 20 is disposed upstream of the compressor 69 in the air passage 50 has been described above. In an alternative example in which the electrical system radiator 30 is disposed upstream of the compressor 69 in the air passage 50, the controller 100 may drive the compressor 69 in response to a cooling request to the electrical system radiator 30 while the fuel cell 10 stops generating power. In such a case, the controller 100 may control the operation of the compressor 69 in accordance with the difference between the current temperature of the electrical system radiator 30 and the target temperature of the electrical system radiator 30, for example. The target temperature of the electrical system radiator 30 may be a temperature of the electrical system radiator 30 at which the refrigerant circulating in the refrigerant circuit in which the electrical system radiator 30 is disposed appropriately cools the components to be cooled. In the case where the air conditioner condenser 20 and the electrical system radiator 30 are disposed upstream of the compressor 69 in the air passage 50, the controller 100 may drive the compressor 69 when there is a cooling request to the air conditioner condenser 20 or the electrical system radiator 30 while the fuel cell 10 stops generating power. In other words, even while the fuel cell 10 stops generating power, the controller 100 may drive the compressor 69 when there is a cooling request to at least one cooling target, i.e., one or both of the air conditioner condenser 20 and the electrical system radiator 30, disposed in the air passage 50. The controller 100 may control the operation of the compressor 69 in accordance with the difference between the current temperature of the cooling target(s) and the target temperature of the cooling target(s).

2-3 Advantageous Effect of Vehicle

Some effects achieved through this embodiment will now be described.

The controller 100 according to the embodiment may drive the compressor 69 when there is a cooling request to at least one cooling target, i.e., one or both of the air conditioner condenser 20 and the electrical system radiator 30 disposed in the air passage 50 (for example, the cooling target may be the air conditioner condenser 20), even while the fuel cell 10 stops generating power. By driving the compressor 69, external air may be drawn into the air passage 50. In this way, the air may pass through the vicinity of the cooling target (for example, the air conditioner condenser 20). Thus, as in the vehicle 1 according to the above-described example, it is possible to appropriately cool the cooling target (for example, the air conditioner condenser 20) while the fuel cell 10 stops generating power, in the vehicle 2 according to the embodiment.

In this embodiment, the controller 100 may control the operation of the compressor 69 in accordance with the difference between the current temperature of the cooling target (for example, the air conditioner condenser 20) and the target temperature of the cooling target. In this way, it is possible to adjust the volume of the external air drawn into the air passage 50 in accordance with the difference between the current temperature of the cooling target and the target temperature of the cooling target.

3. Conclusion

Although some example configurations and example processing according to the embodiments of the technology are described hereinabove, the foregoing embodiments are mere examples and are not intended to limit the scope of the technology. It should be also appreciated that various omissions, replacements, and modifications may be made in the embodiments described herein, without departing from the scope of the spirit of the technology. The technology is intended to include such modifications and alterations in so far as they fall within the scope of the appended claims or the equivalents thereof.

For example, the processes described herein with reference to the flowcharts may not necessarily be executed in the order shown in the flowcharts. Some processing steps may be performed in parallel. Additional processing steps may be employed, and some processing steps may be omitted.

For example, in at least one of the above-described embodiments, the refrigerant sub-channel 44b is disposed in the vicinity of the heat exchanger 70, and heat is exchanged between the refrigerant flowing through the refrigerant sub-channel 44b and the air flowing through the heat exchanger 70. Alternatively, the refrigerant sub-channel disposed in the vicinity of the heat exchanger 70 may be omitted, and heat may be exchanged between the external air around the heat exchanger 70 and the air flowing through the heat exchanger 70.

As described above, it is possible to appropriately control the temperature of the fuel cell.

The invention claimed is:

1. A power supply apparatus for a vehicle, the apparatus comprising:
   a fuel cell;
   an air conditioner condenser disposed in a first circuit of a refrigerant used for air conditioning of a passenger compartment of the vehicle;
   an electrical system radiator disposed in a second circuit of a refrigerant used for cooling of in-vehicle electric devices other than the fuel cell;
   a fuel cell radiator disposed in a third circuit of a refrigerant used for cooling of the fuel cell; and
   a compressor disposed in an air passage coupled to the fuel cell, the compressor being configured to introduce air to the fuel cell through the air passage,
   one or both of the air conditioner condenser and the electrical system radiator being disposed upstream of the compressor in the air passage.

2. The power supply apparatus according to claim 1, further comprising
   a heat exchanger disposed downstream of the compressor in the air passage.

3. The power supply apparatus according to claim 2, further comprising:
   a controller configured to control an operation of the compressor; and
   a return passage coupled to the air passage and the compressor, the return passage being configured to return the air compressed by the compressor to the compressor, wherein,
   the compressor includes an air bearing that supports a rotor via an air layer, and
   the controller drives the compressor regardless of whether the fuel cell is generating power.

4. The power supply apparatus according to claim 2, further comprising
   a controller configured to control an operation of the compressor, wherein,
   the controller is configured
      to drive the compressor while the fuel cell is generating power, and
      to drive the compressor when a cooling request is made to at least one cooling target disposed in the air passage while the fuel cell stops generating power, the least one cooling target comprising one or both of the air conditioner condenser and the electrical system radiator.

5. The power supply apparatus according to claim 4, wherein the controller is configured to control the operation of the compressor in accordance with a difference between a current temperature of the cooling target and a target temperature of the cooling target.

6. The power supply control apparatus according to claim 2, further comprising
   a pump disposed in the third circuit, wherein,
   the heat exchanger is configured to exchange heat between the refrigerant used for cooling of the fuel cell and the air flowing through the air passage, and
   the controller is configured to drive the pump while the fuel cell stops generating power and the compressor is driven.

7. The power supply control apparatus according to claim 3, further comprising
   a pump disposed in the third circuit, wherein,
   the heat exchanger is configured to exchange heat between the refrigerant used for cooling of the fuel cell and the air flowing through the air passage, and
   the controller is configured to drive the pump while the fuel cell stops generating power and the compressor is driven.

8. The power supply control apparatus according to claim 4, further comprising
   a pump disposed in the third circuit, wherein,
   the heat exchanger is configured to exchange heat between the refrigerant used for cooling of the fuel cell and the air flowing through the air passage, and
   the controller is configured to drive the pump while the fuel cell stops generating power and the compressor is driven.

9. The power supply control apparatus according to claim 5, further comprising
   a pump disposed in the third circuit, wherein,
   the heat exchanger is configured to exchange heat between the refrigerant used for cooling of the fuel cell and the air flowing through the air passage, and
   the controller is configured to drive the pump while the fuel cell stops generating power and the compressor is driven.

10. The power supply apparatus according to claim 6, further comprising
    a fan configured to supply cooling air to the fuel cell radiator, wherein
    the controller is configured to control an operation of the fan to lower a temperature of the air to be introduced into the fuel cell to a predetermined temperature or below while the fuel cell 10 stops generating power and the compressor is driven.

11. The power supply apparatus according to claim 7, further comprising
    a fan configured to supply cooling air to the fuel cell radiator, wherein
    the controller is configured to control an operation of the fan to lower a temperature of the air to be introduced into the fuel cell to a predetermined temperature or below while the fuel cell 10 stops generating power and the compressor is driven.

12. The power supply apparatus according to claim 8, further comprising a fan configured to supply cooling air to the fuel cell radiator, wherein the controller is configured to control an operation of the fan to lower a temperature of the air to be introduced into the fuel cell to a predetermined temperature or below while the fuel cell 10 stops generating power and the compressor is driven.

13. The power supply apparatus according to claim 9, further comprising a fan configured to supply cooling air to the fuel cell radiator, wherein the controller is configured to control an operation of the fan to lower a temperature of the air to be introduced into the fuel cell to a predetermined temperature or below while the fuel cell 10 stops generating power and the compressor is driven.

14. The power supply apparatus according to claim 1, wherein at least the air conditioner condenser out of the air conditioner condenser and the electrical system radiator is disposed upstream of the compressor in the air passage.

15. The power supply apparatus according to claim 2, wherein at least the air conditioner condenser out of the air conditioner condenser and the electrical system radiator is disposed upstream of the compressor in the air passage.

16. The power supply apparatus according to claim 3, wherein at least the air conditioner condenser out of the air conditioner condenser and the electrical system radiator is disposed upstream of the compressor in the air passage.

17. The power supply apparatus according to claim 4, wherein at least the air conditioner condenser out of the air conditioner condenser and the electrical system radiator is disposed upstream of the compressor in the air passage.

18. The power supply apparatus according to claim 5, wherein at least the air conditioner condenser out of the air conditioner condenser and the electrical system radiator is disposed upstream of the compressor in the air passage.

19. The power supply apparatus according to claim 6, wherein at least the air conditioner condenser out of the air conditioner condenser and the electrical system radiator is disposed upstream of the compressor in the air passage.

\* \* \* \* \*